(12) United States Patent
Taki et al.

(10) Patent No.: US 10,362,185 B2
(45) Date of Patent: Jul. 23, 2019

(54) IMAGE FORMING APPARATUS, IMAGE FORMING SYSTEM, AND CONTROL PROGRAM FOR IMAGE FORMING SYSTEM

(71) Applicant: Konica Minolta, Inc., Tokyo (JP)

(72) Inventors: Kenji Taki, Tokyo (JP); Hiroyuki Arai, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/824,393

(22) Filed: Nov. 28, 2017

(65) Prior Publication Data
US 2018/0152573 A1  May 31, 2018

(30) Foreign Application Priority Data

Nov. 29, 2016  (JP) .................................. 2016-231544

(51) Int. Cl.
*H04N 1/00* (2006.01)
*H04N 1/32* (2006.01)

(52) U.S. Cl.
CPC ..... *H04N 1/00663* (2013.01); *H04N 1/00477* (2013.01); *H04N 1/00602* (2013.01); *H04N 1/32641* (2013.01)

(58) Field of Classification Search
CPC ........... H04N 1/00663; H04N 1/00477; H04N 1/00602; H04N 1/32641

USPC ................................................ 358/3.26, 3.12
See application file for complete search history.

(56) References Cited

U.S. PATENT DOCUMENTS

| | | | | |
|---|---|---|---|---|
| 2009/0315242 A1* | 12/2009 | Milillo | .................... | B42C 1/125 270/58.13 |
| 2013/0208290 A1* | 8/2013 | Ikari | .................. | H04N 1/00015 358/1.12 |
| 2018/0124257 A1* | 5/2018 | Ueda | .................. | H04N 1/00005 |

FOREIGN PATENT DOCUMENTS

| | | |
|---|---|---|
| JP | 2005043613 | 2/2005 |
| JP | 2007124040 | 10/2005 |

* cited by examiner

*Primary Examiner* — Cheukfan Lee
(74) *Attorney, Agent, or Firm* — BakerHostetler

(57) ABSTRACT

In an image forming apparatus, while executing a print job that designates a delivery destination of a printed matte of a first quality to a first delivery tray, and prints multiple sets in which each set includes multiple sheets subjected to image formation in order of pages based on multiple page image data, in a case of having determined that a printed matter being conveyed is a printed matter of the second quality, printed matters of one set consecutive from the printed matter of the second quality are delivered to the second delivery tray, and thereafter, a printed matter of the first quality is delivered to the first delivery tray.

16 Claims, 11 Drawing Sheets

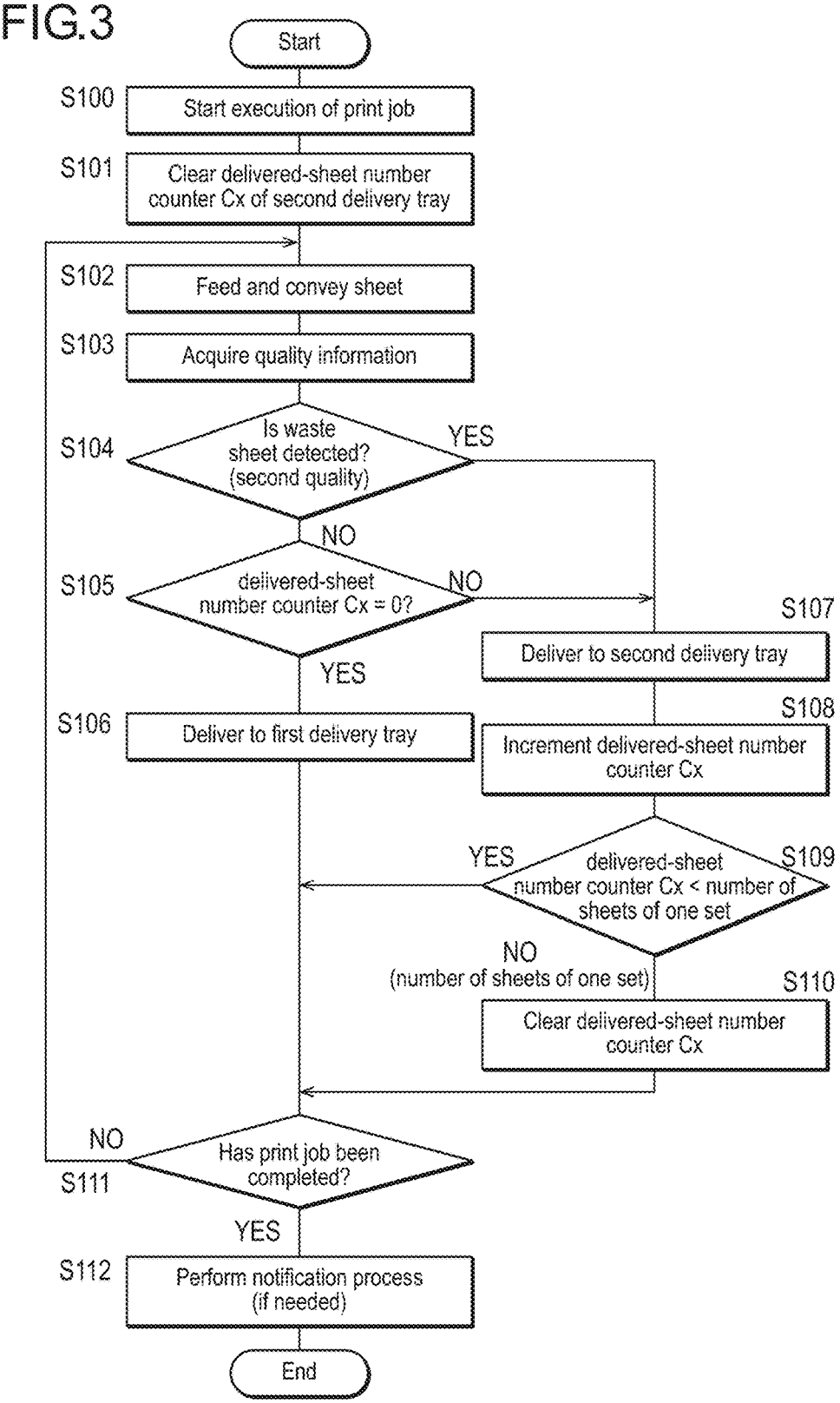

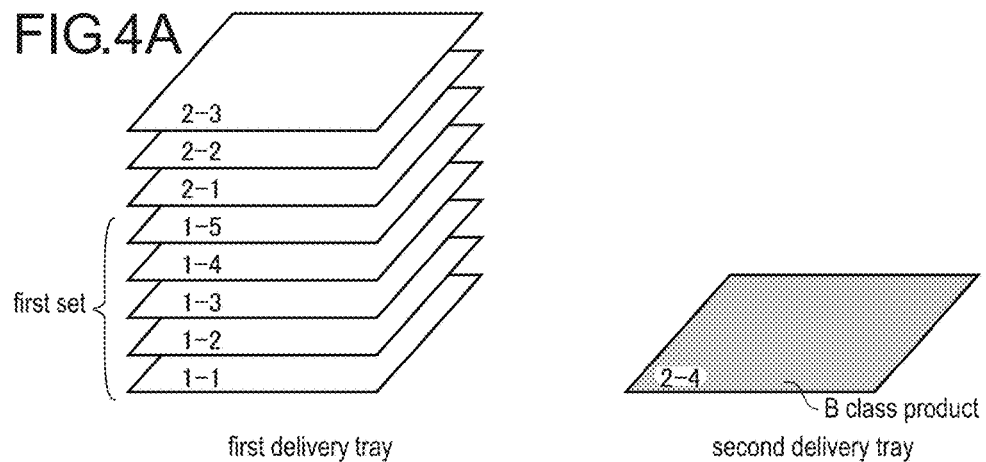
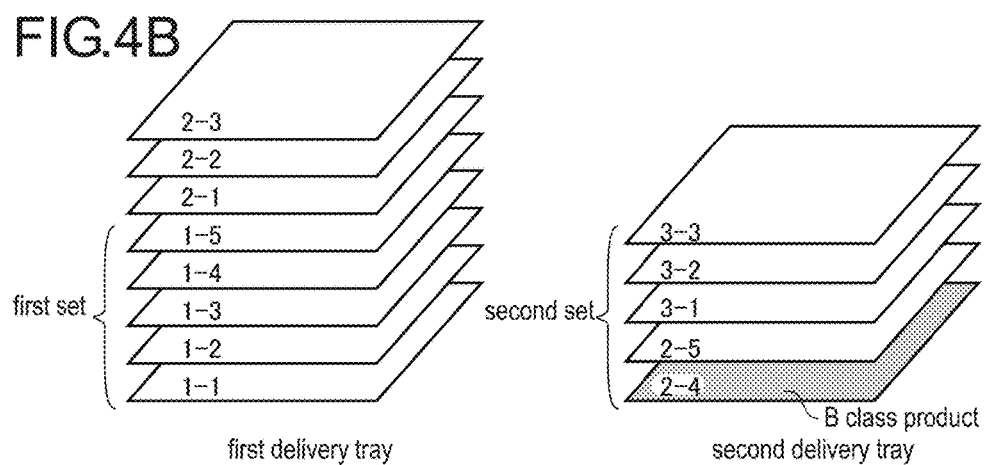
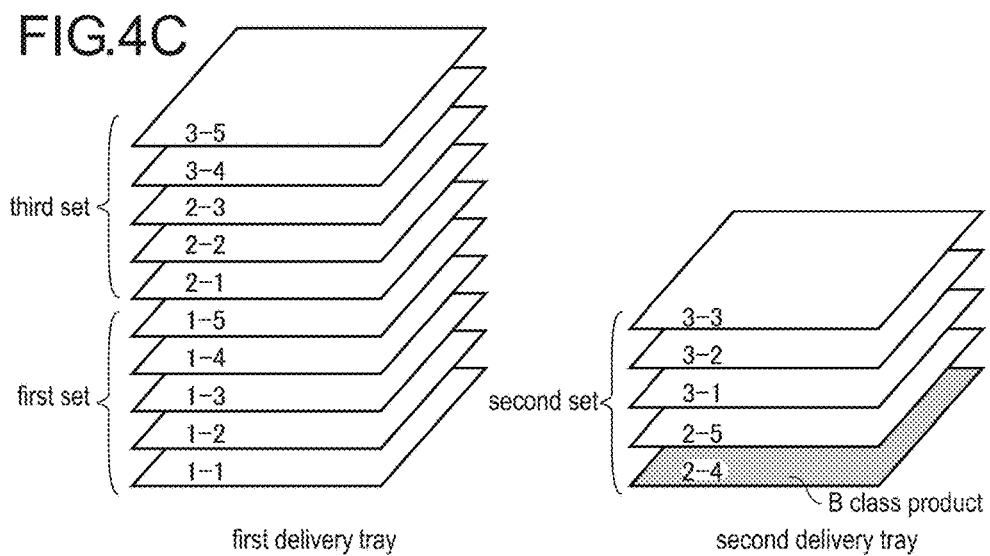

IMAGE FORMING APPARATUS, IMAGE FORMING SYSTEM, AND CONTROL PROGRAM FOR IMAGE FORMING SYSTEM

CROSS-REFERENCE TO RELATED APPLICATION

This application claims priority under 35 U.S.C. § 119 to Japanese Patent Application No. 2016-231544, filed on Nov. 29, 2016, the entire disclosure (including the description, claims, drawings, and abstract) of which is incorporated herein by reference.

BACKGROUND

1. Technical Field

The present invention relates to an image forming apparatus, an image forming system, and a non-transitory computer-readable storage medium storing control programs.

2. Description of Related Arts

In image forming apparatuses, such as a copying machine, a facsimile, a printer, and a composite machine, based on the image data of a print job, images are formed on sheets in an image former, and printed matters are produced.

In the case where the conveyance of sheets is not performed correctly due to double feed or skew, or in the case where the density, color tone, or the like of an image formed by the image former fluctuates due to environmental change, the quality of printed matters fluctuates. In some of image forming apparatuses, defects of such quality are detected by sensors disposed in an apparatus, such as a sensor to detect double feed and an optical sensor to read images on a sheet in real time while producing printed matters.

In the image forming apparatus disclosed by Japanese Unexamined Patent Publication No. 2007-124040, an ultrasonic sensor to detect double feed of sheets is disposed on a sheet conveyance passage, thereby detecting double feed in real time. Moreover, in the above image forming apparatus, in the case where double feed has been detected when images are formed successively on sheets and the sheets are delivered to the first tray, the tray is switched such that sheets having caused the detected double feed are delivered to the third tray and all sheets following the above sheets are delivered to the second tray. Furthermore, after the double feed has been detected, an image formed on the sheet having caused the double feed is reprinted (recovery print) on a sheet, and then, the sheet is delivered to the first tray.

By doing in this way, even if double feed has occurred, since image formation can be continued, the lowering of job efficiency is prevented, and the burden on a user is reduced.

SUMMARY

In general, quality standards are determined beforehand such that all users are satisfied. However, even if a printed matter does not satisfy the quality standards, the printed matter may be permissible for some users. For example, in the case where a user permits a sheet having caused double feed, a printed matter formed on the sheet having caused double feed can be used as it is. In such a case, like the above patent publication, in the case where an image formed on a sheet having caused double feed is made to be subjected to recovery print, sheets and time required for recovery print becomes useless.

The present invention has been achieved in view of the above-described circumstances, and an object of the present invention is to provide an image forming apparatus in which, in the case where a printed matter not satisfying quality standards occurs, a user can distinguish the printed matter easily, and the printed matter is delivered in a state capable of being used easily.

To achieve at least one of the abovementioned objects, according to an aspect of the present invention, an image forming apparatus reflecting one aspect of the present invention, comprises:

a sheet conveyor that conveys a sheet fed from a sheet tray along a conveyance passage;

an image former that forms an image on the conveyed sheet based on image data of a print job;

a deliverer that includes a first delivery tray and a second delivery tray and delivers a printed matter with an image formed on the sheet in the image former;

a quality information acquisitor that includes a sensor disposed on the conveyance passage and acquires quality information of a printed matter based on output of the sensor; and a processor that compares the quality information with a predetermined quality standard, thereby determining whether a printed matter conveyed to the deliverer is a printed matter of a first quality satisfying the quality standard or a printed matter of a second quality not satisfying the quality standard, wherein while executing a print job that designates a delivery destination of a printed matte of the first quality to the first delivery tray, and prints multiple sets in which each set includes multiple sheets subjected to image formation in order of pages based on multiple page image data, in a case of having determined that a printed matter being conveyed is a printed matter of the second quality, the processor controls such that printed matters of one set consecutive from the printed matter of the second quality are delivered to the second delivery tray, and thereafter, a printed matter of the first quality is delivered to the first delivery tray.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a flowchart showing sheet delivery control according to the first embodiment performed by a processor;

FIGS. 4A, 4B and 4C are schematic diagrams showing a delivery state of sheets;

DETAILED DESCRIPTION OF EMBODIMENTS

Figure 1:
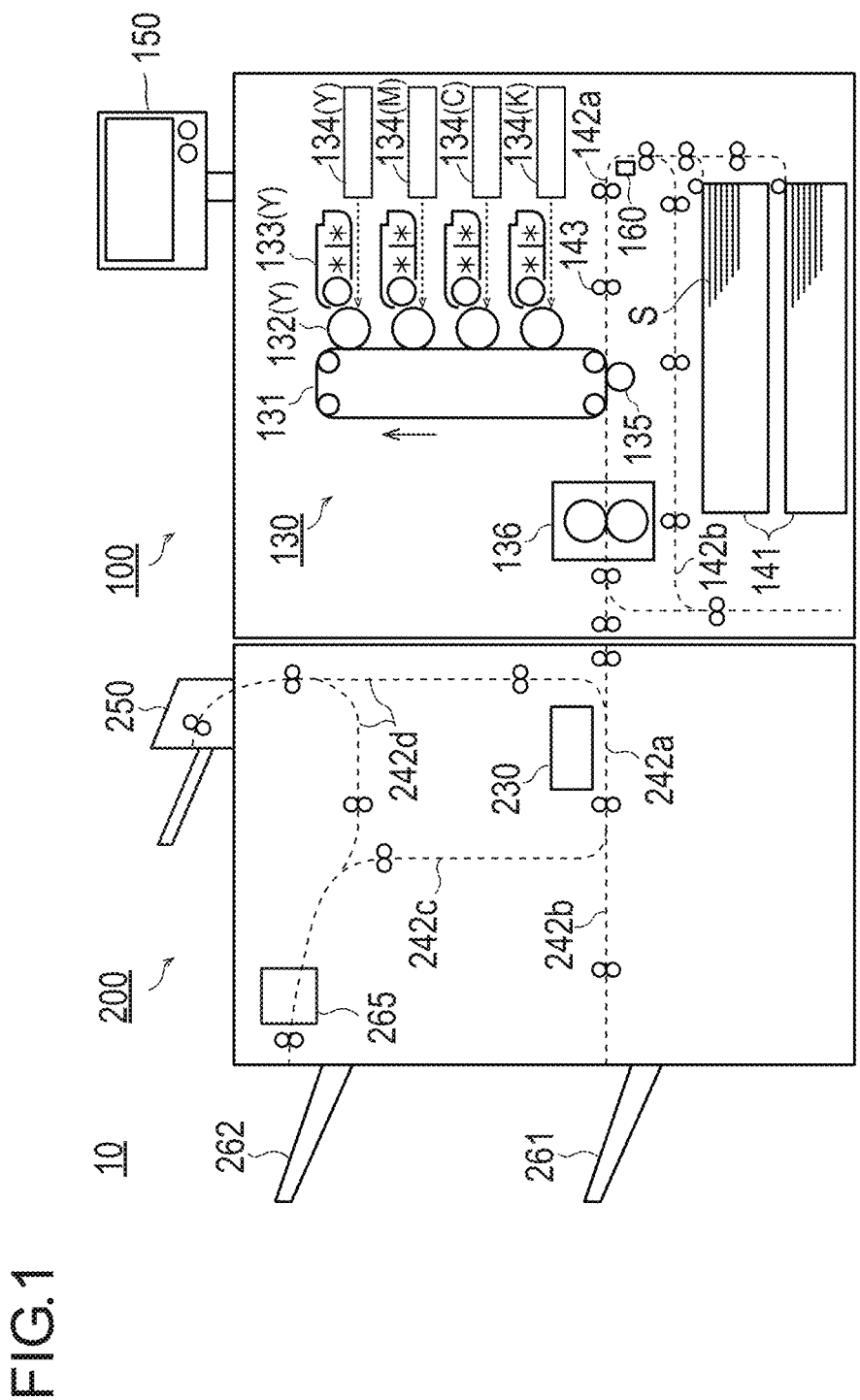
FIG. 1 is an illustration showing a schematic constitution of an image forming system equipped with an image forming apparatus and a post processing apparatus according to one embodiment of the present invention.

Hereinafter, one or more embodiments of the present invention will be described with reference to the drawings. However, the scope of the invention is not limited to the disclosed embodiments. In the description of the drawings, the same sign is given to the same element, and a duplicate description is omitted. Since dimension ratios in the drawings are exaggerated on account of description, the ratios may be different from the actual ratios.

Figure 2:
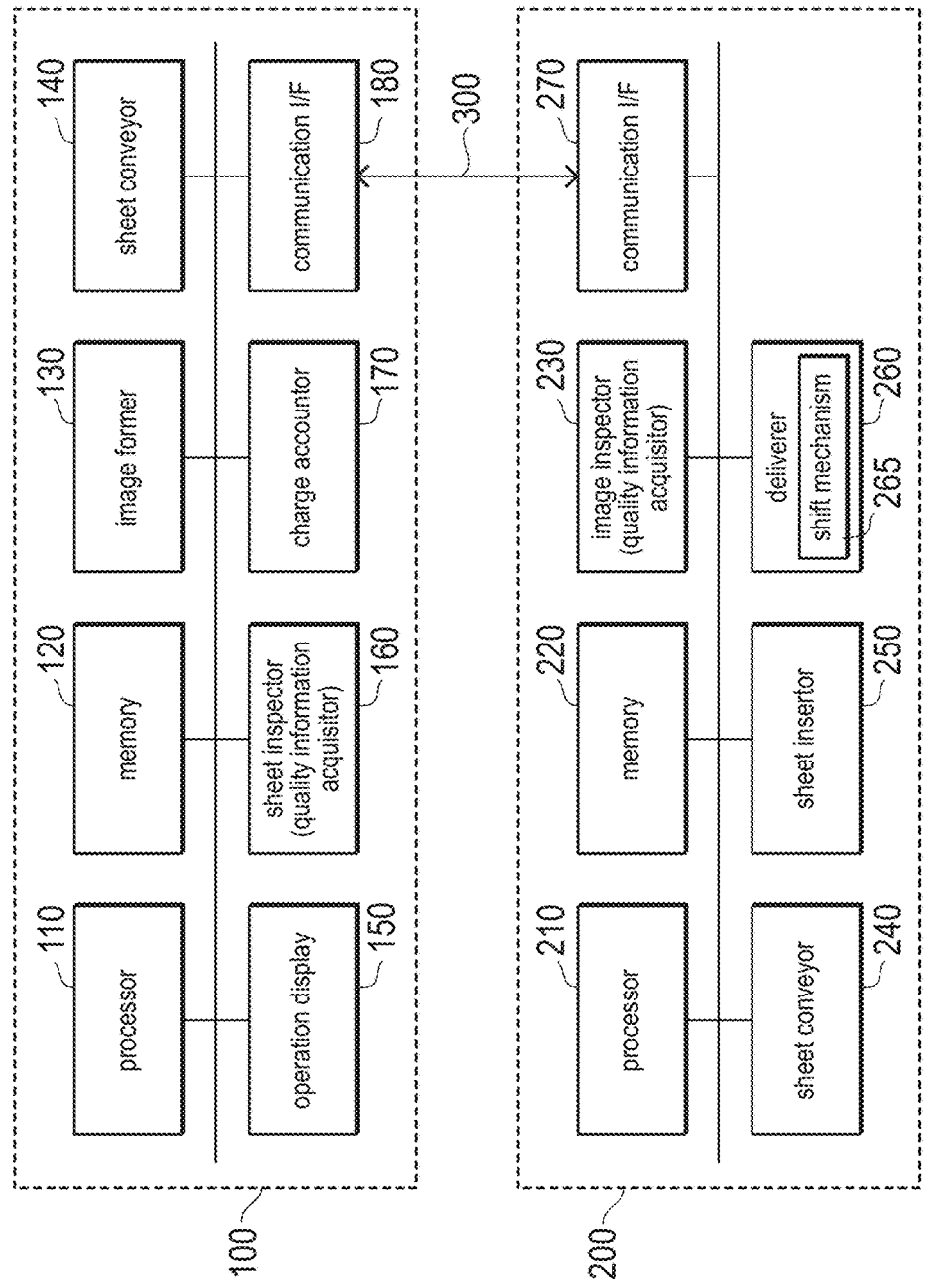
FIG. 2 is a block diagram showing a hardware constitution of an image forming system.

FIG. 1 is an illustration showing a schematic constitution of an image forming system 10 equipped with an image forming apparatus 100 and a post processing apparatus 200 according to one embodiment of the present invention. FIG. 2 is a block diagram showing a hardware constitution of the image forming system 10.

As shown in FIG. 1 and FIG. 2, the image forming system 10 includes the image forming apparatus 100 and the post processing apparatus 200. A sheet S having been subjected to image formation in the image forming apparatus 100 is delivered to a delivery tray 261 or 262 via the post processing apparatus 200. Hereinafter, each constitution will be described.

(Image Forming Apparatus 100)

As shown in FIG. 1 and FIG. 2, the image forming apparatus 100 includes a processor 110, a memory 120, an image former 130, a sheet conveyor 140, an operation display 150, a sheet inspector 160, a charge accountor 170, and a communication interface (I/F) 180. These devices are connected to each other via signal lines, such as bus to exchange signals.

The processor 110 is a CPU and performs control for each of the above-described devices and various kinds of arithmetic processing in accordance with programs.

The memory 120 includes a ROM storing various programs and various kinds of data of quality standards and other data beforehand, a RAM to memorize programs and data temporarily as a working region, and a hard disk to store various kinds of programs and various kinds of data.

The image former 130 includes an intermediate transfer belt 131, a photoconductor drum 132, a developer 133, a writer 134, a transferor 135, and a fixing apparatus 136. The image former 130 forms an image on a sheet S based on print data of a print job by using a well-known image creating process, such as an electrophotographic process including processes of electric charging, image-wise exposing, developing, transferring, and fixing. Among these constitutional devices, the photoconductor drum 132 and the developer 133 includes multiple photoconductor drums and multiple developers respectively corresponding to basic colors of Y, M, C, and K. However, in FIG. 1, although Y color is provided with a sign (Y), signs for other colors are omitted.

The sheet conveyor 140 includes sheet feed trays 141, conveyance passages 142a and 142b, a plurality of conveyance roller pairs including registration rollers 143, and driving motors (not-illustrated) to drive these conveyance roller pairs. A sheet S fed out one by one from the sheet feed tray 141 is conveyed along the conveyance passage 142a, and further conveyed to the image former 130 at a timing adjusted by the registration roller 143. Then, on the surface of the sheet S, an image is formed by the image former 130. In the case of forming images on both surfaces, after a sheet has been subjected to image formation onto one surface thereof by the image former 130, the sheet S is conveyed along the conveyance passage 142b for both surface print such that the front surface and back surface of the sheet S are inverted. Thereafter, the sheet S is conveyed again to the image former 130 via the conveyance passage 142a so as to be subjected to image formation for the another surface.

The operation display 150 includes a touch panel, a numeric keypad, a start button, a stop button, etc., and is used for displaying various kinds of information and for inputting various kinds of instruction. Moreover, the operation display 150 functions as a "notifier" and a "receiver", and as described later, the operation display 150 receives an instruction of recovery print and a setting instruction to divide quality standards into the first class or the second class (mentioned later) from a user via a displayed operation screen 151. The various kinds of received settings are memorized in the memory 120.

The sheet inspector 160 is disposed on the conveyance passage 142a, and detects a state of a conveyed sheet. This sheet inspector 160 functions as a "quality information acquisitor", and includes an ultrasonic sensor, a sheet detection sensor, and a line sensor. The processor 110 uses the output of each of these sensors as quality information and determines the quality of each of printed matters. The determining method of quality will described later.

The ultrasonic sensor includes a transmitter and a receiver that are arranged to face each other across the conveyance passage 142a. The ultrasonic wave transmitted from the transmitter penetrates a sheet, and received by the receiver. The thickness of a sheet, i.e., the existence or nonexistence of double feed in which two or more sheets are conveyed in a state of being superimposed on each other, is detected based on a degree of lowering of a signal amount received by the receiver.

The sheet detection sensor includes a pair of photo sensors to detect the passing of a sheet. The paired photo sensors are arranged separately at the both sides of a width direction perpendicular to the conveyance direction of the sheet (hereinafter, merely referred to as a "width direction"). Based on a time difference between the respective output signals of the paired photo sensors, a difference between the times at which the both sides of the leading end of the sheet in the width direction pass through the respective paired photo sensors, that is, skew at the time of conveying the sheet is detected A line sensor is an image sensor in which photoelectric conversion elements, such as CIS (Contact Image Sensor) and CCD (Charge Coupled Device) are arranged along a width direction in one row or multiple rows in a line form, and reads out a one-dimensional image. Moreover, the line sensor includes optical elements such as light emitting elements and lens arrays arranged along the row of the photoelectric conversion elements. This line sensor is arranged so as to detect one end of a sheet in the width direction so that the line sensor detects a deviation of a sheet in the width direction at the time of conveying the sheet.

The charge accountor 170 includes a charge accounting table corresponding to processing contents such as sheet information (size, basic weight, and the kind of a sheet), print mode (color print, both side print, and the kind of post processing), and the like. In accordance with the control of the processor 110, the charge accountor 170 counts a billing counter corresponding to the processing contents for each output of a printed matter and calculates a charging amount for a print job of a user. The charge accountor 170 may be equipped with a coin vendor (a terminal device to receive bill, coins, and a prepaid cart), and may perform a charge accounting process for the amount of money deposited from the user through the coin vendor for each time of the execution of a print job.

The communication interface 180 is an interface through which the image forming apparatus 100 communicates with external devices, such as the post processing apparatus 200, PC, and the like. The communication interface 180 transmits and receives various setting values and various kinds of information required for operation timing control with the post processing apparatuses 200. For the communication interface 180, various kinds of local connection interfaces such as network interfaces according to standards such as SATA, PCI, USB, Ethernet (registered trademark), IEEE 1394 and the like, and wireless communication interfaces such as Bluetooth (registered trademark), IEEE 802.11, etc. are used.

(Post Processing Apparatus 200)

As shown in FIG. 1 and FIG. 2, the post processing apparatus 200 includes a processor 210, a memory 220, an image inspector 230, a sheet conveyor 240, a sheet insertor 250, a deliverer 260, and a communication interface 270. The above devices are connected with each other via signal lines such as buses to exchange signals. The processor 210 is connected with the processor 110 of the image forming apparatus 100 through the communication line 300 so as to be able to communicate with each other, and controls the whole image forming system 10 by cooperating with the processor 110 of the image forming apparatus 100. Among the above constitutional devices, since each of the processor 210, the memory 220, and the communication interface 270 is the same as the corresponding device of the image forming apparatus 100, description for them is omitted.

As shown in FIG. 1, the image inspector 230 is disposed on the conveyance passage 242a, reads an image formed on the surface of a sheet S conveyed from the conveyance passage 142a on the upstream side, and obtains image data. The processor 110 uses the image data obtained by the image inspector 230 as quality information, performs quality determination of a printed matter, and performs color adjustment and image position adjustment.

The image inspector 230 is a so-called scanner, and includes a sensor array, an optical system, and an LED (Light Emitting Diode) light source.

The sensor array includes optical elements, such as a plurality of CCDs arranged in the form of a line along the width direction (main scanning direction), and is a color line sensor capable of reading a range of the whole width in the width direction of a sheet S. The optical system is constituted by a plurality of mirrors and a lens. The light from the LED light source is irradiated to the surface of a sheet S being passing through a reading position on the conveyance passage 242a. An image on the reading position is introduced by the optical system, and is focused on the sensor array.

The sheet conveyor 240 includes conveyance passages 242a to 242d, a plurality of conveyance roller pairs, and driving motors (not shown) to drive these conveyance roller pairs. A sheet S conveyed from the conveyance passage 142a of the image forming apparatus 100 on the upstream side is conveyed via the conveyance passage 242a to one of the conveyance passages 242b and 242c on the downstream side.

The sheet insertor 250 includes one or more insertion trays. In the insertion tray of the sheet insertor 250, pre-printed sheets, colored sheets, and the like are loaded. These sheets are supplied to each delivery tray via a conveyance passage 242d, and for example, are used as a cover sheet of a bundle of printed matters, or an insertion sheet to separate chapters. Moreover, a sheet S supplied from the sheet insertor 250 can be used also as a partition sheet described later.

The deliverer 260 includes a first delivery tray 261, a second delivery tray 262, and a shift mechanism 265. A sheets S (printed matter) conveyed via the conveyance passages 242b or 242c is placed on the first delivery tray 261 or the second delivery tray 262, respectively. The shift mechanism 265 delivers a sheet S conveyed through the conveyance passage 242c by shifting (offset) the delivery position of the sheet S in the width direction about several millimeters to 50 mm.

First Embodiment (Sheet Delivery Control)

Next, a characteristic operation executed by the image forming system 10 according to the first embodiment performs will be described. In the operation described below, the processor 110 determines whether a printed matter with an image formed on a sheet S satisfies quality standards based on quality information acquired from the sheet inspector 160 and the image inspector 230. Then, in the case where the printed matter satisfies all the quality standards, the processor 110 determines its quality to be a first quality (hereinafter, also referred to as a "normal product"). On the other hand, in the case where the printed matter does not satisfy any of the quality standards, the processor 110 determines its quality to be a second quality (hereinafter, also referred to as a "B class product").

The quality standards include quality standards relating to a conveyance state of a sheet S and quality standards relating to an image state formed on a sheet S. The quality standards relating to the conveyance state include, for example, skew, deviation to one side and double feed. The quality standards relating to the image state include, for example, image density, color tone, and image positions on the front surface and the back surface. The quality standards have been determined beforehand, and are memorized in the memory 120. However, a user may be set them through the operation display 150. For example, it is made possible for user to set an amount of deviation to one side (mm) and a color tone (ΔE with respect to a target value). As described above, the determination as to whether a printed matter satisfies these quality standards is performed based on the quality information acquired from the sheet inspector 160 and the image inspector 230 both serving as the quality information acquisitor.

Hereinafter, sheet delivery control will be described with reference to FIG. 3 and FIG. 4. FIG. 3 is a flowchart showing a sheet delivery control executed by the processor 110 in cooperation with the processor 210 according to the first embodiment. FIG. 4 is a schematic diagram showing a delivery state of sheets.

This sheet delivery control includes processes performed after a print job has been received. This print job is to print a plurality of sets each including a plurality of sheets on which images are formed in the order of pages based on a plurality of page image data. The delivery destination of the printed matters is set to the first delivery tray 261.

As shown in FIG. 3, first, the processor 110 starts the execution of the print job to print a plurality of sets (S100). Next, a delivered-sheet number counter Cx to count the number of sheets delivered to the second delivery tray 262 is cleared (to be zero) (S101).

Then, based on the setting of a print job, a sheet S is fed from the sheet feed tray 141, and is conveyed to respective conveyance passages (S102).

Next, the processor 110 performs sensing for a printed matter by each sensor of the sheet inspector 160 and the image inspector 230, and acquires detection data and image data, i.e., quality information (S103).

Next, the processor 110 determines whether this printed matter is a waste sheet based on the acquired quality information in Step S103. That is, the processor 110 determines based on the quality information acquired from the quality information acquisitor whether the printed matter is a printed matter of the second quality that does not satisfy any of the quality standards (S104).

In the case where it has been determined that the quality of the printed matter is not the second quality, i.e., the quality is a normal product of the first quality (S104: NO), the processor 110 determines whether the delivered-sheet number counter Cx is 0 (zero) (S105). In the case where the delivered-sheet number counter Cx is zero (S105: YES), this printed matter is delivered to the first delivery tray 261 according to the setting of the print job (S106).

On the other hand, in the case where it has been determined that the quality of the printed matter is the second quality (S104: YES), or in the case where the delivered-sheet number counter Cx is not 0 (S105: NO), this printed matter is delivered to the second delivery tray 262 different from the setting of the print job (S107).

Then, the delivered-sheet number counter Cx is incremented (S108).

Next, the processor 110 determines whether the delivered-sheet number counter Cx is smaller than the number of sheets of one set, for example, five sheets, (S109). In the case where the delivered-sheet number counter Cx is not smaller, i.e., the delivered-sheet number counter Cx reaches the number of sheets of one set (S109: NO), the delivered-sheet number counter Cx is cleared (S110), and the process is advanced to the next process.

The processes up to the above are repeated until the print job is completed (S111: NO). On the other hand, in the case where the print job has been completed (S111: YES), next, if needed, a notification process is performed via the operation display 150, and then the processes end (S112, End). The example of this notification process will be described later.

In the case where the above processes have been performed, how to deliver printed matters for each delivery tray is described with reference to FIG. 4.

In the example shown in FIGS. 4A, 4B and 4C, in a print job to be performed, the number of printed matters constituting one set is five sheets, and three sets of the printed matters are output. FIGS. 4A, 4B and 4C show a state where the printed matter of the fourth sheet of the second set has been determined to be the second quality. Note that, in FIGS. 4A, 4B and 4C, the printed matter of the m-th sheet in order of pages in the n-th set is written as a printed matter n-m (hereinafter, this writing manner is the same). For example, a printed matter 2-4 indicates the printed matter of the fourth sheet of the second set.

FIG. 4A shows a state where printed matters of a printed matter 1-1 to a printed matter 1-5 of the first set and a printed matter 2-1 to a printed matter 2-3 of the second set have been delivered to the first delivery tray 261, and further shows a state where the next printed matter 2-4 has been determined to be the second quality and it has been delivered to the second delivery tray 262. Since all the printed matters up to the printed matter 2-3 are the first quality, all the printed matters up to the printed matter 2-3 are delivered to the first delivery tray 261. In the process up to the above, the delivered-sheet number counter Cx remains zero. By having delivered the following printed matter 2-4 to the second delivery tray 262, since the delivered-sheet number counter Cx is incremented, the delivered-sheet number counter Cx is set to 1 (S108).

After that, since the delivered-sheet number counter Cx is not zero (S105: NO), until the delivered-sheet number counter Cx reaches the number of sheets of one set, i.e., 5, and then is cleared (S108), even if the subsequent printed matters are the first quality, the subsequent printed matters are delivered to the second delivery tray 262.

FIG. 4B is an illustration showing a state where the printed matters of one set up to a printed matter 3-3 have been delivered to the second delivery tray 262. Among the printed matters of one set delivered to the second delivery tray 262, the bottom printed matter 2-4 is a printed matter of the second quality of a B class product, and the other printed matters of a printed matter 2-5 and a printed matter 3-1 to a printed matter 3-3 are printed matters of the first quality satisfying all the quality standards.

FIG. 4C is an illustration showing a state where, after that, the printed matters of a printed matter 3-4 and a printed matter 3-5 have been delivered, and the print job has been completed. On the first delivery tray 261, the printed matters of two sets of the first set and the third set are delivered in order of pages. On the other hand, on the second delivery tray 262, although the printed matters are not placed in order of pages, the printed matters of one set of the second set are delivered.

As is apparent from FIG. 4C, by the sheet delivery control performed by the processor 110, printed matters of the first quality that satisfies all of the quality standards and does not have a problem in quality, are delivered to the first delivery tray. On the other hand, a printed matter of the second quality that does not satisfy a part or all of the quality standards and have a problem in quality, and consecutive printed matters of one set including the above printed matter of the second quality are delivered to the second delivery tray. By doing in this way, the printed matters of the first quality and the printed matters of the second quality are distinguishable from each other. Moreover, while executing a print job, even if a printed matter of the second quality is determined, since the print job is continued without being interrupted, it is possible to prevent the lowering of the job efficiency.

Furthermore, the printed matters of one set are delivered on the second delivery tray 262. Accordingly, in the case where if a user can permit a printed matter of the second quality, it is possible to use effectively the printed matters of one set including the printed matter of the second quality delivered to this second delivery tray. For example, since each of the multiple quality standards is set such that many users are satisfied, there may be a case where a part of users determines that if a printed matter does not satisfy a certain quality standard, the printed matter can be used (usable). In such a case, when a double feed occurs, in the case where it is constituted like Japanese Unexamined Patent Publication No. 2007-124040 that a recovery print is performed automatically, sheets and printing time for the recovery print become useless. The term "usable" described herein includes a case where, although a printed matter does not reach slightly the quality standards required by a user, for example, by providing the printed matter for use of a user oneself not used for distribution, a utility value different from an original one is accepted.

In this way, in the case where a user can permit a printed matter of the second quality, the printed matter of the second quality is distinguished from printed matters of the first quality, and in addition, can be delivered in a state capable of being used easily.

(Notification Process for User)

Herein, the notification process in Step S112 in FIG. 3 is described. In the sheet delivery control shown in FIG. 3, to the second delivery tray 262, a printed matter of the second quality (B class product) is delivered. In such a case, it is more desirable to make a notification process in order to also tell the delivery of the printed matter of the second quality to a user clearly.

Figure 5:
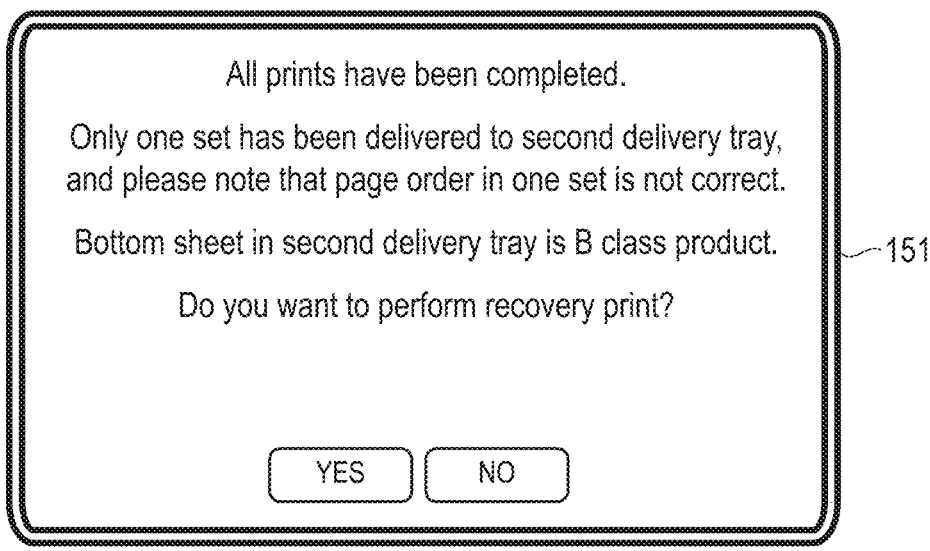
FIG. 5 shows an example of an operation screen displayed on an operation display.

FIG. 5 shows an example of an operation screen 151 displayed on the operation display 150 according to the notification process. In the example shown in FIG. 5, a situation that a printed matter of the second quality is delivered to the second delivery tray 262, and information on at which position among a plurality of printed matters a printed matter of the second quality is present, are shown for a user. By doing in this way, the user can find the printed matter of the second quality easily.

Moreover, by selecting a YES button of YES and NO buttons shown in FIG. 5, the user can execute the recovery print of a printed matter of the second quality. In the case of having received an instruction of a recovery print from a user, the processor 110 executes a recovery print by reusing the image data used for the image formation for the printed matter of the second quality, i.e., in the example shown in FIG. 4, the printed matter 2-4. In the case where the post processing apparatus 200 includes post processing functions, such as a stapling process and a print job requests to execute post processing per units of sets, the recovery print of one set may be executed. By providing such a selection button, in the case where a user cannot satisfy a printed matter of the second quality, the user can make a recovery print to be performed.

In the above description, although the delivery trays 261 and 262 are used as the first and second delivery tray, respectively, the present invention should not be limited to this example. In the case where there are three or more delivery trays, one of the delivery trays becoming a delivery destination by print setting (by automatic or designation) is made a first delivery tray, and any one of the other delivery trays being not used may be used as a second delivery tray.

First Modified Example

Figure 6:
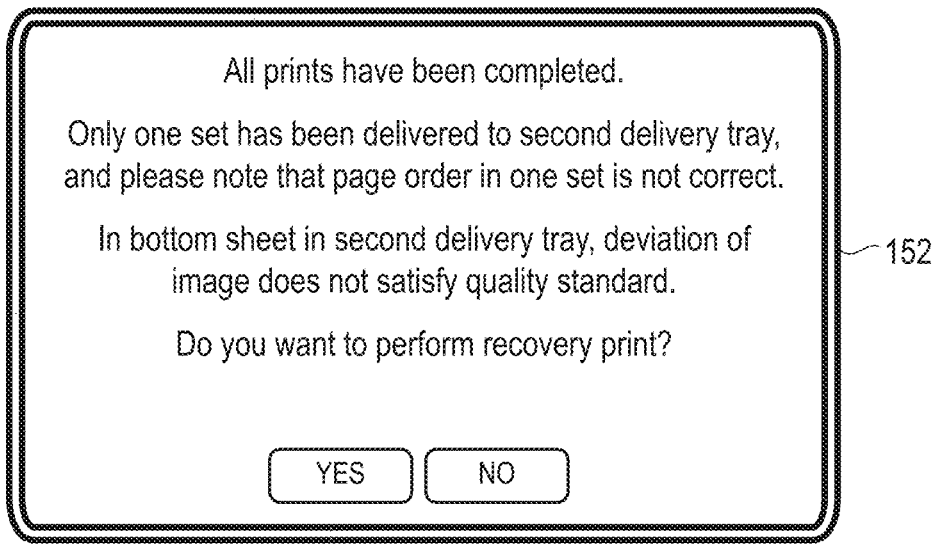
FIG. 6 shows an example of an operation screen displayed on an operation display in a modified example.

FIG. 6 shows an example of an operation screen 152 displayed on the operation display 150 according to a modified example of the notification process. In the example shown in FIG. 6, the type of a quality standard which a print matter of the second quality has not satisfied is further shown. As shown in FIG. 6, by notifying a user that deviation of an image to one side does not satisfy a quality standard, it is possible for the user to determination easily whether a printed matter of the second quality can be used as it is.

Second Embodiment

Figure 7:
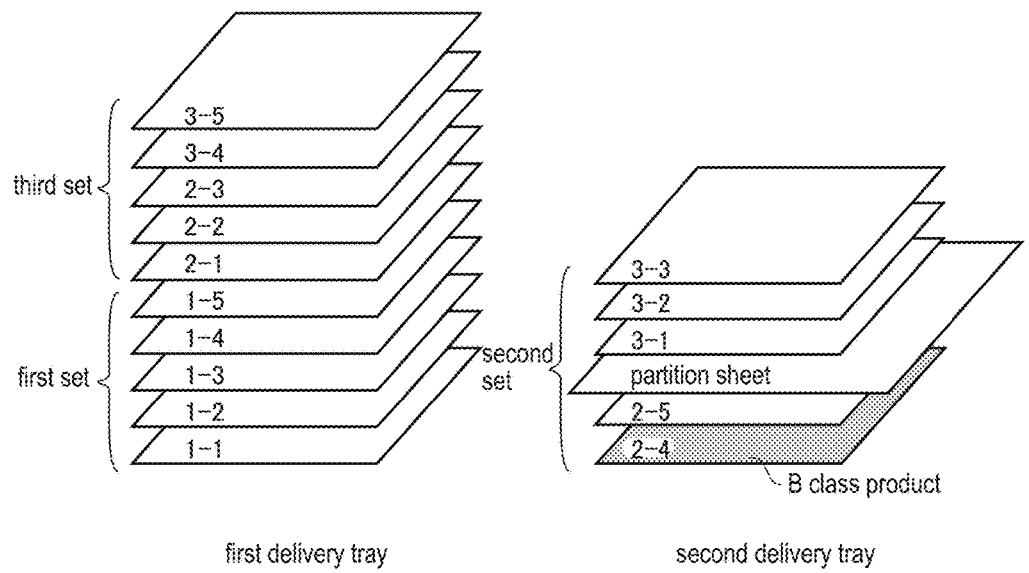
FIG. 7 is a schematic diagram showing a delivery state of sheets in the second embodiment.

In the second embodiment described below, it makes easy to use printed matters delivered to the second delivery tray 262. FIG. 7 is a schematic diagram showing a delivery state of sheets in the second embodiment. In FIG. 7, a partition sheet is inserted between the last page of a set delivered to the second delivery tray 262 and the first page following the last page. The insertion of this partition sheet can be performed by, for example, a sheet supplied from the sheet insertor 250. As the partition sheet, it is sufficient to be distinguishable from the other sheet. The partition sheet is preferably a paper different in color or size. However, a blank sheet with the same size may be inserted. Moreover, in the case where a printed matter is determined to be the second quality based on the quality information of the sheet inspector 160, if a sheet feeding timing is in time, a sheet S fed from the sheet feed tray 141 may be used as a partition sheet of a blank sheet. In the case where the determination of a printed matter of the second quality is performed multiple times for one print job and the print matters of multiple sets are delivered to the second delivery tray 262, a partition sheet also is inserted between different sets. For example, in the example of FIG. 7, a partition sheet is inserted on the printed matter of 3-3, and then, the printed matters of the following set are further stacked on the partition sheet.

In this way, by inserting a partition sheet, a user can recognize the boundary between the last page and the first page among the printed matters of one set delivered to the second delivery tray 261. Accordingly, since the user can align simply the page order of the printed matters delivered to the second delivery tray 261, it becomes easy to use these printed matters.

Second Modified Example

Moreover, in the case of including the shift mechanism 265 as shown in FIG. 1, the boundary between the last page and the first page can be indicated for a user with the shift mechanism 265. In concrete terms, in the case of a print job as shown in FIG. 4, printed matters from a printed matter 2-4 of the second quality to a printed matter 2-5 of the last page and printed matters from a printed matter 3-1 to a printed matter 3-3 on and after the first page are delivered to the respective different positions in the width direction, whereby the same effect with the second embodiment can be obtained.

Third Embodiment

Figure 8:
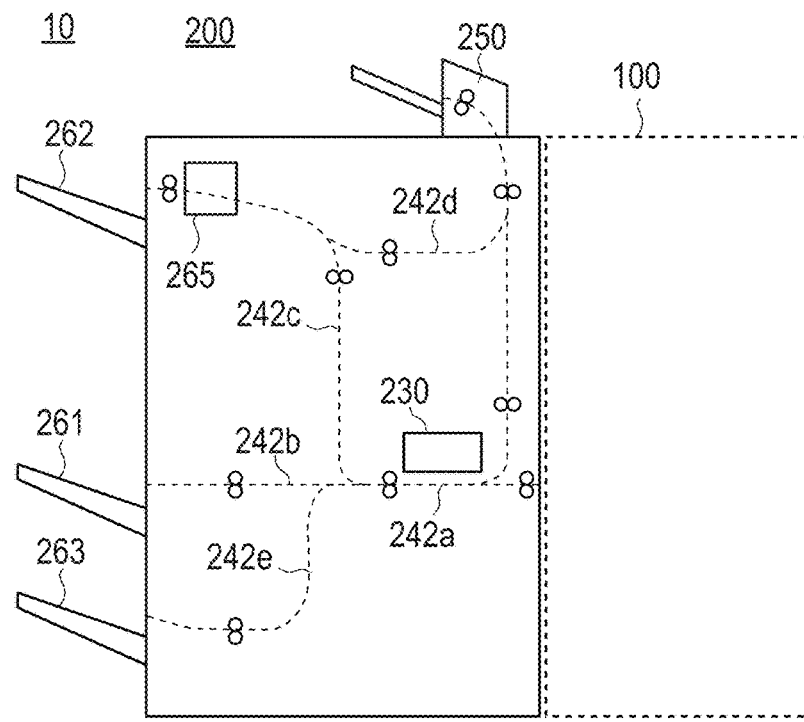
FIG. 8 is an illustration showing a post processing apparatus according to the third embodiment.

In the first embodiment shown in FIG. 1 to FIG. 3, the sheet delivery control is performed using two delivery trays. In the third embodiment described below, the sheet delivery control is performed using three or more delivery trays. FIG. 8 is an illustration showing the image forming system 10 according to the third embodiment. In FIG. 8, since the constitution of the image forming apparatus 100 is the same as that in FIG. 1, the image forming apparatus 100 is omitted. Different from the image forming system 10 shown in FIG. 1, the post processing apparatus 200 shown in FIG.

8 further includes a third delivery tray 263 and a conveyance passage 242e to convey a sheet to the third delivery tray 263.

Figure 9:
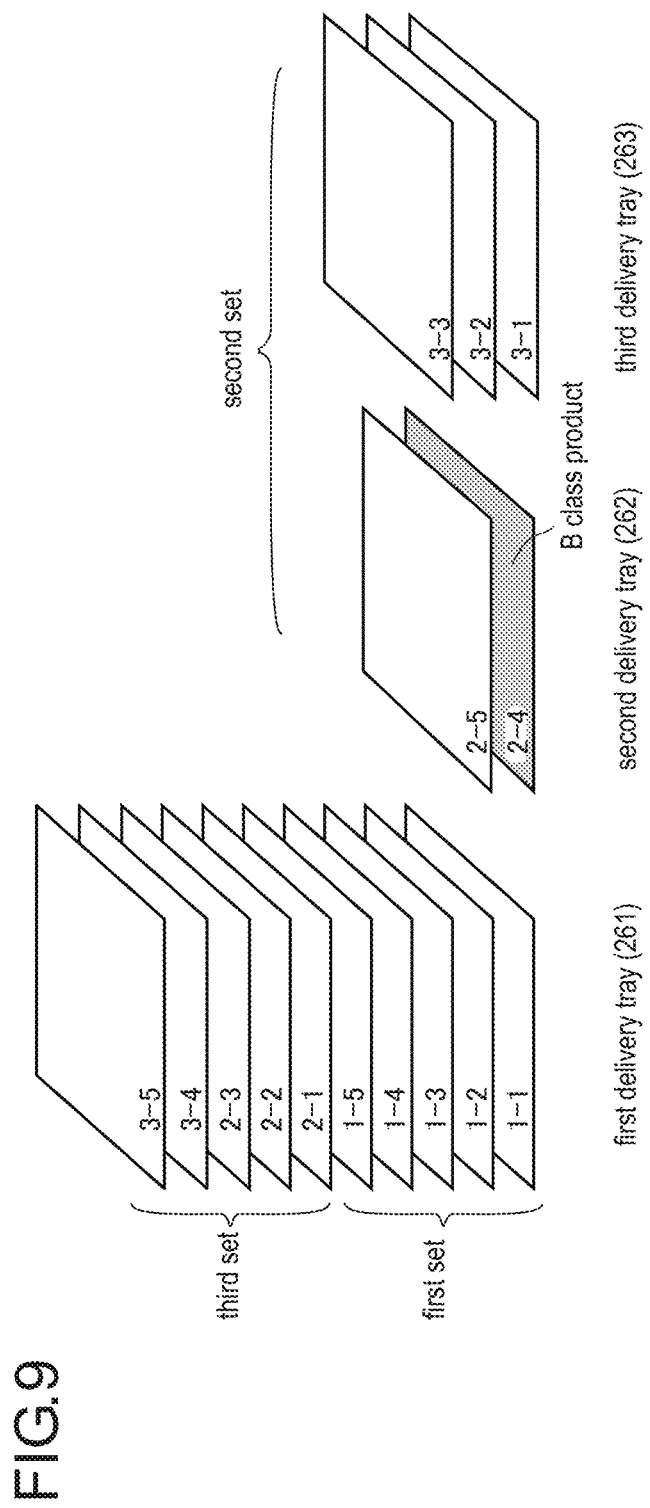
FIG. 9 is a schematic diagram showing a delivery state of sheets in the third embodiment.

FIG. 9 is a schematic diagram showing a delivery state of sheets in the third embodiment using the first to third delivery trays. Similarly to FIG. 4, an example shown in FIG. 9 also shows a state where a printed matter 2-4 has been determined to be the second quality. As shown in FIG. 9, printed matters from the printed matter 2-4 of the second quality to a printed matter 2-5 being the last page are delivered to the second delivery tray 262, and then, printed matters from a printed matter 3-1 to a printed matter 3-3 on and after the first page following the printed matter 2-5 are delivered to the third delivery tray 263 different from the former delivery trays. By doing in this way, the same effect as the second embodiment can be acquired.

Third Modified Example

Figure 10:
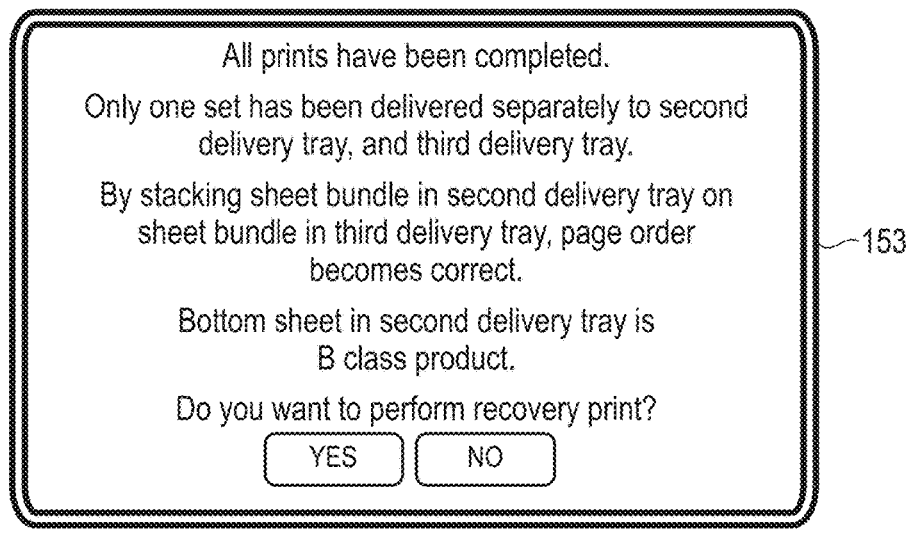
FIG. 10 shows an example of an operation screen displayed on an operation display in a modified example.

FIG. 10 shows an example of an operation screen 153 displayed on the operation display 150. As shown in FIG. 10, how to stack the printed matters of one set delivered to the second delivery tray 262 and third delivery tray 263 in order to align them in the page order is notified to a user, whereby the user can align the alignment order of the printed matters of one set correctly.

Fourth Embodiment

The first delivery tray 261 includes a lifting mechanism equipped with a constitution to move upward and downward in accordance with a loading amount, and can load many printed matters. However, the second delivery tray 262 is an auxiliary tray. Accordingly, as compared with the first delivery tray 261, generally, the number of sheets capable of being loaded on the second delivery tray 262 is small. In the fourth embodiment described below, in the case where the number of sheets constituting one set exceeds a specified number (for example, 100 sheets), the execution of a print job is interrupted.

Figure 11:
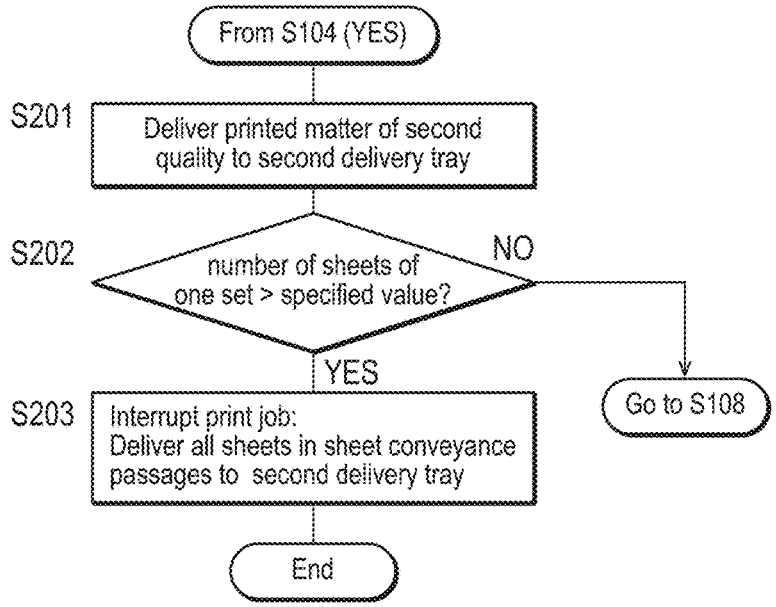
FIG. 11 is a flowchart showing sheet delivery control according to the fourth embodiment.

FIG. 11 is a flowchart showing the sheet delivery control according to the fourth embodiment mainly executed by the processor 110. The flowchart shown in FIG. 11 is executed following step S104 (YES) in the processes in FIG. 3.

First, similarly to step S107, a printed matter of the second quality determined in step S104 is delivered to the second delivery tray 262 (S201).

Next, the processor 110 determines whether the number of sheets constituting one set of a print job currently being executed exceeds a specified value (S202). As this specified value, the accommodation number of sheets capable of being loaded on the second delivery tray 262 as mentioned above may be used, or a value set by a user through the operation display 150 may be used. In the case where the number of sheets does not exceed the specified value (S202: NO), processes on and after step S108 in FIG. 3 are performed. On the other hand, in the case where the number of sheets exceeds the specified value (S202: YES), the process is advanced to step S203.

In step S203, all the sheets (printed matters) being conveyed on sheet conveyance passages in the image forming system 10 are delivered to the second delivery tray. Thereafter, driving motors are stopped, the print job is interrupted, and then the processes are ended (End).

In this way, in the fourth embodiment, whether the delivery to the second delivery tray 262 is continued, is determined based on the number of sheets of one set, whereby it becomes possible to prevent printed matters from overflowing the second delivery tray 262.

Fifth Embodiment

A user can instruct the execution of a recovery print through the operation screen 151 shown in FIG. 5.

However, in the case where a user permits a printed matter delivered to the second delivery tray, a recovery print can be omitted. In such a case, a charging amount by the charge accountor 170 is made to reduce. For example, the charging accounting is not made by applying a predetermined reduction rate for a printed matter of the second quality, or a charge rate is made half of the usual rate. Moreover, a predetermined reduction rate is applied to all the printed matters of one set delivered to the second delivery tray 262. By doing in this way, the use of a printed matter of the second quality by a user can be promoted.

Sixth Embodiment

In the first embodiment, in the case where a printed matter of the second quality has been determined, the consecutive printed matters of one set including the printed matter of the second quality are delivered to the second delivery tray 262. On the other hand, in the sixth embodiment described below, in the case where the determination of a printed matter of the second quality is repeated, the execution of a print job is interrupted.

Figure 12:
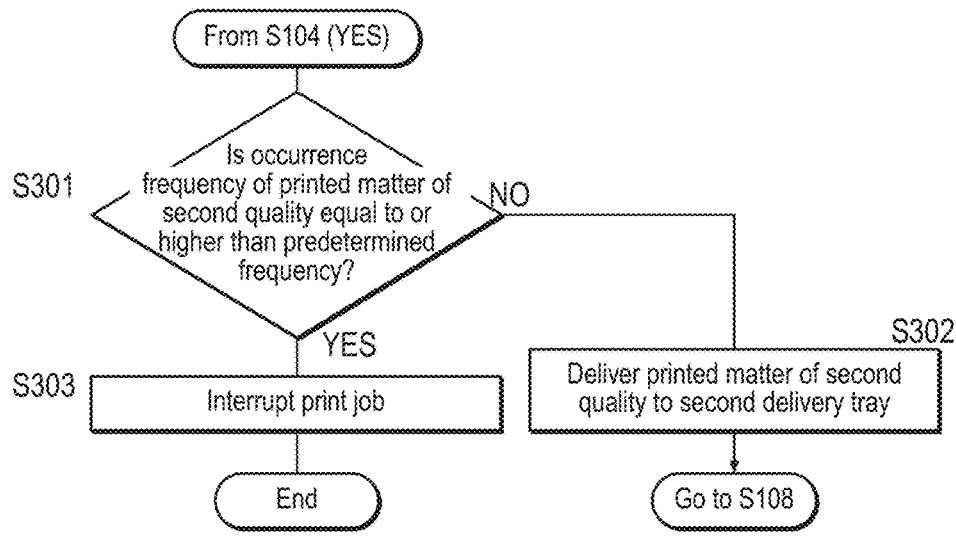
FIG. 12 is a flowchart showing sheet delivery control according to the sixth embodiment.

FIG. 12 is a flowchart showing the sheet delivery control according to the sixth embodiment mainly executed by the processor 110. The flowchart shown in FIG. 12 is executed following S104 (YES) in the processes in FIG. 3.

First, the processor 110 determines whether the occurrence frequency of a printed matter of the second quality is equal to or higher than a predetermined frequency (S301). This predetermined frequency is defined, for example, by an occurrence frequency (times per sheets) per the number of printed matters, or by the number of sheets having caused continuous occurrence. This occurrence frequency may be determined within one print job, or may be determined across multiple print jobs.

In the case where the occurrence frequency is not equal to or higher than predetermined frequency (S301: NO), similarly to S107 in FIG. 3, a printed matter of the second quality is delivered to the second delivery tray 262 (S302), and hereinafter, processes on and after S108 in FIG. 3 are performed.

On the other hand, in the case where the occurrence frequency is equal to or higher than predetermined frequency (S301: YES), printing is interrupted (S303), and then, processes are ended.

With regard to the interruption of printing, all sheets (printed matter) being conveyed may be controlled to be stopped immediately (immediate stop). Alternatively, similarly to the above-mentioned step S203, sheets being conveyed may be delivered to any of the delivery trays, and thereafter, driving motors may be stopped.

Fourth Modified Example

Figure 13:
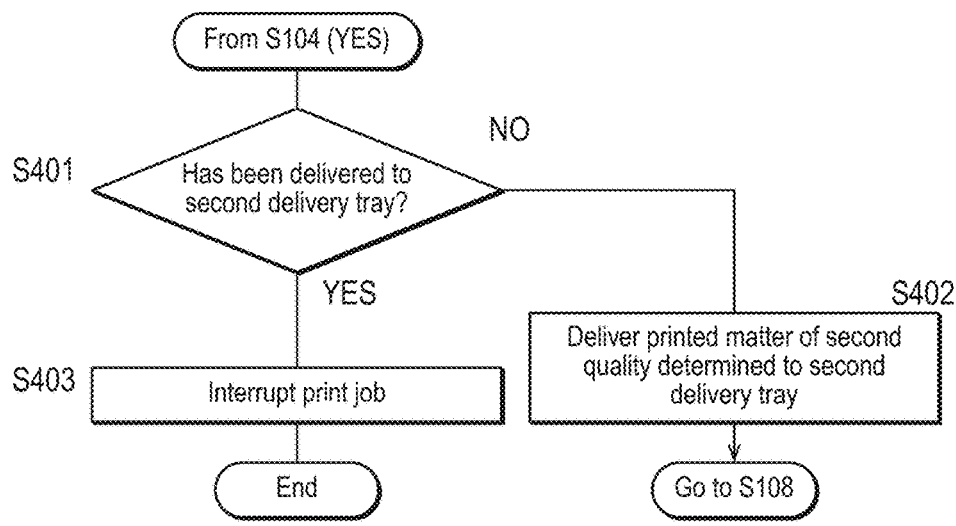
FIG. 13 is a flowchart showing sheet delivery control according to a modified example.

FIG. 13 is a flowchart showing the sheet delivery control according to a modified example. The flowchart shown in FIG. 13 is executed following S104 (YES) in the processes in FIG. 3.

First, the processor 100 determines whether other printed matter of the second quality has been delivered to the second delivery tray 262, i.e., whether a printed matter of the second quality has been determined multiple times between different sets of a single print job (S401).

In the case where other printed matter of the second quality has not been delivered (S401: NO), similarly to S107 in FIG. 3, a printed matter of the second quality is delivered to the second delivery tray 262 (S402), and hereinafter, processes on and after S108 in FIG. 3 are performed.

On the other hand, in the case where other printed matter of the second quality has been delivered (S401: YES), similarly to S303, printing is interrupted (S403), and then, processes are ended.

In this way, in the sixth embodiment and its modified example, it is possible to prevent the printed matters of multiple sets including a printed matter of the second quality from being repeatedly delivered to the second delivery tray 262. In this case, furthermore, the type of a quality standard having been not satisfied and remedial measures may be informed for a user through the operation display 150. For example, in the case where the quality standard is skew or deviation to one side, since there is a possibility to improve the skew or the deviation by resetting the sheet feed tray 141, the remedial measures is informed for a user so as to urge the user to reset. Moreover, in the case where the type of the quality standard has a high possibility to be unable to be remedied by the measure of a user, notification is performed so as to urge the user to ask a serviceman call.

Seventh Embodiment

In the first embodiment, in the case where a printed matter does not satisfy any of the quality standards, the printed matter is determined as a printed matter of the second quality with a possibility that a user may permit, and is delivered to the second delivery tray 262. In the seventh embodiment shown below, it is possible to set the types of quality standards that a user can permit (hereinafter, referred to as "quality standards of the second class") and the types of quality standards that a user cannot permit (hereinafter, referred to as "quality standards of the first class"). Furthermore, a sheet delivery control is performed in accordance with the type of a quality standard having been not satisfied.

Figure 14:
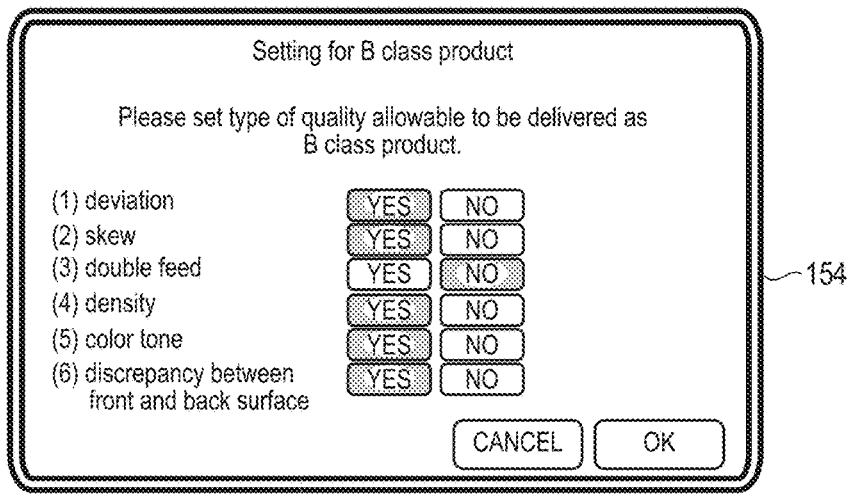
FIG. 14 shows an example of an operation screen to set the class of a quality standard.

FIG. 14 shows an example of an operation screen 154 displayed on the operation display 150 to set the class of each of quality standards. In the example shown in FIG. 14, the user can set the class of a quality standard independently for each of the types of (1) to (6) with regard to quality standards through the operation screen 154. In the initial state, each of quality standards is set to "the second class", i.e., "YES". The quality standard of the second class is permissible as a printed matter (B class product) of the second quality. If a user has a non-permissible quality standard, the user can change it to "the first class" by changing the setting to "NO".

The example shown in FIG. 14 shows a state where a user who does not accept that a blank sheet is missing in printed matters due to double feed having occurred, has changed the setting of "(3) Double Feed" to "NO". Since this user can permit with regard to the type of each of quality standards other than (3), the user remains the setting of each of them at "YES".

Here, description is given to a determining method of the class of a quality standard and a printed matter of each of the first quality to the third quality. "A printed matter of the first quality" is a printed matter that satisfies all the quality standards including both of the first class and the second class. "A printed matter of the third quality" is a printed matter that does not satisfy the quality standards of the first class. In the example of FIG. 14, a printed matter that does not satisfy the quality standard of (3) double feeds, becomes a printed matter of the third quality irrespective of the determination of each of other quality standards. "A printed matter of the second quality" is a printed matter other than the printed matter of the first quality and the printed matter of the third quality. That is, the printed matter of the second quality is a printed matter that satisfies all the quality standards of the first class, but does not satisfy any of the quality standards of the second class. For example, printed matters of the first quality, the second quality, and the third quality correspond to a normal product, a B class product, and a NG product, respectively. FIG. 14 shows an example in which the first class and the second class are classified by YES and NO. However, for example, "(4) Density" may be set three stages, may be specify a numeral value, or may be selected from three stages or more, whereby the boundary between the both classes may be set.

Figure 15:
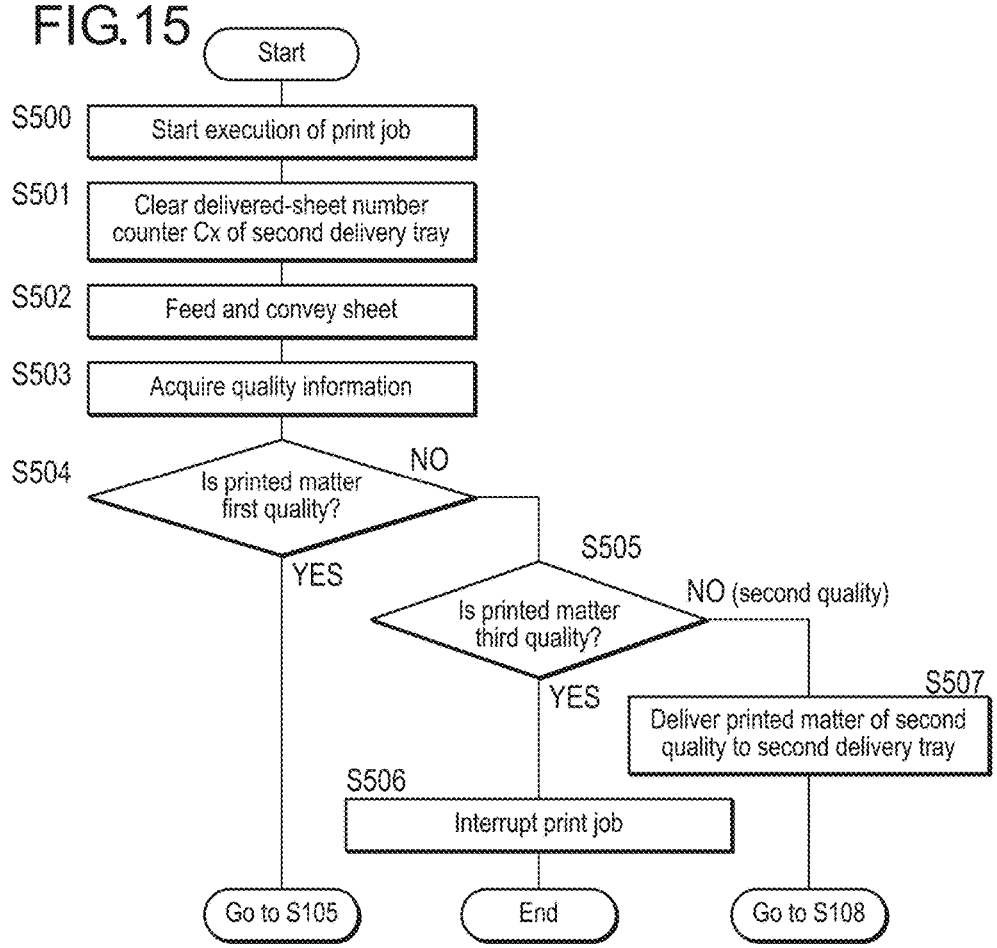
FIG. 15 is a flowchart showing sheet delivery control according to the seventh embodiment.

FIG. 15 is a flowchart showing the sheet delivery control according to the seventh embodiment mainly executed by the processor 110. As shown in FIG. 15, the processor 110 performs the processes from step S500 to step S503. Since these processes are the same as those from step S100 to step S103 in FIG. 3, description for them is omitted.

Next, the processor 110 determines, based on the quality information acquired in step S503, whether this printed matter is a printed matter of the first quality by the above-mentioned determining method for a printed matter (S504). In the case where the above printed matter is a printed matter of the first quality (S504: YES), the process is advanced to step S105 in FIG. 3. On the other hand, in the case where the above printed matter is not a printed matter of the first quality (S504: NO), whether the above printed matter is a printed matter of the third quality is determined in the next process (S505).

In the case where the printed matter is a printed matter of the third quality (S505: YES), the print job being executed is interrupted, and then, the processes are ended (S506, End). With regard to the interruption of printing, all sheets (printed matter) being conveyed may be controlled to be stopped immediately (immediate stop). Alternatively, similarly to the above-mentioned step S203, sheets being conveyed may be delivered to any of the delivery trays, and thereafter, driving motors may be stopped.

On the other hand, in the case where the printed matter is not a printed matter of the third quality, i.e., is a printed matter of the second quality (S505: NO), the printed matter of this second quality is delivered to the second delivery tray 262 (S507), and thereafter, the processes on and after S108 in FIG. 3 are performed.

In this way, in the seventh embodiment, in the case where there is a type of a quality standard for which a user cannot permit dissatisfaction, the user set this to the first class. Then, in the case where a printed matter (printed matter of the third class) is determined not to satisfy the quality standards of the first class, the execution of the print job is interrupted. By doing in this way, the same effect as the first embodiment is acquired, and further, it is possible to prevent the production of the printed matter (printed matter of the third quality) not satisfying the quality standard of the first type.

Fifth Modified Example

In the seventh embodiment, in the case where a printed matter of the third quality has been determined, printing is interrupted. In the fifth modified example shown below, without interrupting printing, a printed matter of the third quality is delivered to the fourth delivery tray (the third delivery tray 263 may be assigned) other than the first and second delivery trays.

Figure 16:
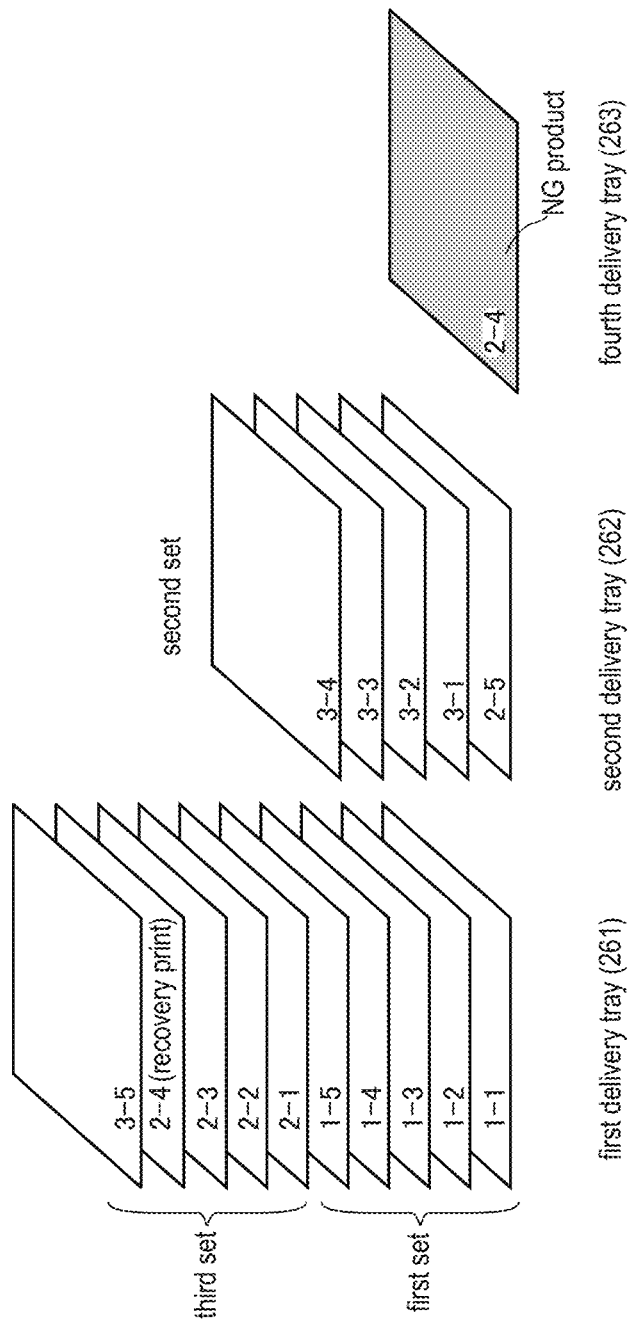
FIG. 16 is a schematic diagram showing a delivery state of sheets in the fifth modified example.

Hereinafter, the fifth modified example is described with reference to FIG. 16. FIG. 16 is a schematic diagram showing a delivery state of sheets in the fifth modified example. In the example shown in FIG. 16, in the case where a printed matter 2-4 has been determined to be the third quality (NG product) (S505: YES), this printed matter is delivered to the fourth delivery tray.

Then, printed matters from a printed matter 2-5 to a printed matter 3-4 of one set after the printed matter 2-4 are delivered to the second delivery tray. During this delivery, image date having been used to form the printed matter of the third quality has been prepared, and then recovery print of a printed matter 2-4 is executed by using the above image data. With this, as shown in FIG. 16, the printed matters of the first quality of three sets in total corresponding to the print job are delivered to the first and second delivery tray.

In this way, in the fifth modified example, in addition to the effect of the seventh embodiment, since the printed matter of the third quality is delivered to the fourth delivery tray, it becomes possible for a user to distinguish the printed matter of the third quality from other printed matters easily.

Other Modified Example

In the constitution of the image forming system described above, the main constitutions have been described to describe the feature of each of the above described embodiments and modified examples. Accordingly, the present invention should not be limited to the above constitution. Moreover, it is not intended to exclude the constitutions that general image forming systems are equipped.

For example, in the present embodiments, the quality information acquisitor includes the ultrasonic sensor, the sheet detection sensor, the sheet inspector 160 equipped with a line sensor, and the image inspector 230 equipped with a CCD sensor. However, a part of the above devices may be omitted. Moreover, the post processing apparatus 200 may be equipped with the post processor that performs post processing, such as stapler processing and punch processing, for one or more sheets on which images are formed.

Furthermore, control programs making the image forming system operate may be provided by a computer readable storage medium, such as a USB memory, a flexible disk, a CD-ROM, or may be provided via on-line through networks, such as Internet. In this case, the control programs stored in the computer-readable storage medium are usually transferred to a memory, a storage, etc., and are stored in them. Furthermore, the control programs may be provided, for example, as independent application software, or may also be incorporated in software of each apparatus as one function of the image forming system.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus, comprising:
a sheet conveyor that conveys a sheet fed from a sheet tray along a conveyance passage;
an image former that forms an image on the conveyed sheet based on image data of a print job;
a deliverer that includes a first delivery tray and a second delivery tray and delivers a printed matter with an image formed on the sheet in the image former;
a quality information acquisitor that includes a sensor disposed on the conveyance passage and acquires quality information of a printed matter based on output of the sensor; and
a processor that compares the quality information with a predetermined quality standard, thereby determining whether a printed matter conveyed to the deliverer is a printed matter of a first quality satisfying the quality standard or a printed matter of a second quality not satisfying the quality standard,
wherein while executing a print job that designates a delivery destination of a printed matter of the first quality to the first delivery tray, and prints multiple sets in which each set includes multiple sheets subjected to image formation in order of pages based on multiple page image data, in a case of having determined that a printed matter being conveyed is a printed matter of the second quality, the processor controls such that printed matters of one set consecutive from the printed matter of the second quality are delivered to the second delivery tray, and thereafter, a printed matter of the first quality is delivered to the first delivery tray.

2. The image forming apparatus as claimed in claim 1, further comprising: a notifier,
wherein the processor notifies a user by the notifier that the printed matter of the second quality has been delivered to the second delivery tray.

3. The image forming apparatus as claimed in claim 2, wherein the processor notifies by the notifier the user of information indicating that which of printed matters delivered to the second delivery tray is the printed matter of the second quality.

4. The image forming apparatus as claimed in claim 2, wherein the quality standard includes multiple quality standards corresponding to multiple types of the quality information, and wherein in a case where a printed matter does not satisfy any of the quality standards corresponding to the multiple types of the quality information, the processor determines the printer matter to be a printed matter of the second quality, and the processor notifies by the notifier the user of information regarding a type of the quality information not satisfying the quality standards.

5. The image forming apparatus as claimed in claim 1, further comprising: a receiver to receive an instruction from a user,
wherein in accordance with an execution instruction of recovery print received by the receiver, recovery print of a printed matter delivered to the second delivery tray is executed.

6. The image forming apparatus as claimed in claim 1, wherein a partition sheet is inserted between the last page and the first page among the printed matters of one set delivered to the second delivery tray.

7. The image forming apparatus as claimed in claim 1, wherein the deliverer further includes a shift mechanism to shift a printed matter in a width direction perpendicular to a conveyance direction, and among the printed matters of one set delivered to the second delivery tray, the shift mechanism shifts printed matters from the printed matter of the second quality to the printed matter of the last page and printed matters on and after the first page to respective different positions.

8. The image forming apparatus as claimed in claim 1, wherein the deliverer further includes a third delivery tray, and among the printed matters of one set consecutive from the printed matter of the second quality, printed matters from the printed matter of the second quality to a printed matter of the last page are delivered to the second delivery tray, and printed matters on and after the first page following the last page are delivered to the third delivery tray.

9. The image forming apparatus as claimed in claim 8, further comprising a notifier, wherein the processor notifies by the notifier a user of a procedure to stack in order to align the printed matters of one set delivered separately to the second delivery tray and the third delivery tray in order of pages.

10. The image forming apparatus as claimed in claim 1, wherein in a case where the processor determines a printed matter being conveyed to be a printed matter of the second quality, the processor further determines whether the number of sheets constituting the one set is equal to or more than a predetermined number of sheets, and in a case where it has been determined that the number of sheets is equal to or more than the predetermined number of sheets, the printed matter of the second quality and only printed matter being conveyed on the conveyance passage on the upstream side than the printed matter of the second quality are delivered to the second delivery tray, and execution of the print job is interrupted.

11. The image forming apparatus as claimed in claim 5, wherein when calculating a charging amount correspondingly to a number of the page image data or the number of sheets having subjected to image formation, in a case where the print job has been completed without executing a recovery print, the processor reduced a charging amount for all printed matters delivered to the second delivery tray or the printed matter of the second quality.

12. The image forming apparatus as claimed in claim 1, wherein in a case where determination of a printed matter of the second quality has been performed at frequency more than a predetermined frequency, or in a case where determination of a printed matter of the second quality has been performed multiple times for a single print job, the processor interrupts the print job being executed.

13. The image forming apparatus as claimed in claim 1, wherein the quality standard includes multiple quality standards corresponding to multiple kinds of the quality information, and each of the quality standards is able to be set to any one of a first class quality standard used to determination of a printed matte of a third quality and a second class quality standard used to determination of a printed matte of second quality, wherein the processor compares the quality information acquired from the quality information acquisitor with the quality standards, thereby determining whether a printed matter being conveyed to the deliverer is a printed matter of the first quality satisfying the first class and second class quality standards, a printed matter of the third quality not satisfying the first class quality standard, or a printed matter of the second quality satisfying the first class quality standard, but not satisfying the second class quality standard, and wherein while executing the print job to print multiple sets, in a case where a printed matter being conveyed is determined to be a printed matter of the third quality, the processor interrupts execution of the print job.

14. The image forming apparatus as claimed in claim 1, wherein the deliverer further includes a fourth tray, wherein the quality standard includes multiple quality standards corresponding to multiple kinds of the quality information, and each of the quality standards is able to be set to any one of a first class quality standard used to determination of a printed matte of a third quality and a second class quality standard used to determination of a printed matte of a second quality, wherein the processor compares the quality information acquired from the quality information acquisitor with the quality standards, thereby determining whether a printed matter being conveyed to the deliverer is a printed matter of the first quality satisfying the first class and second class quality standards, a printed matter of the third quality not satisfying the first class quality standard, or a printed matter of the second quality satisfying the first class quality standard, but not satisfying the second class quality standard, and wherein while executing the print job to print multiple sets, in a case where a printed matter being conveyed is determined to be a printed matter of the third quality, the printed matter of the third quality is delivered to the fourth delivery tray.

15. An image forming system, comprising:
an image forming apparatus that forms an image on a paper sheet, including,
a first sheet conveyor that conveys a sheet fed from a sheet tray along a first conveyance passage;
an image former that forms an image on the conveyed sheet based on image data of a print job; and
a first quality information acquisitor that includes a sensor disposed on the first conveyance passage and acquires quality information of a printed matter based on output of the sensor;
a post processing apparatus that inspects a printed matter with an image formed on a sheet in the image forming apparatus, the post processing apparatus including,
a second sheet conveyor that conveys a printed matter conveyed from the first sheet conveyor along a second conveyance passage;
a deliverer that includes a first delivery tray and a second delivery tray and delivers a printed matter conveyed from the second sheet conveyor; and
a second quality information acquisitor that includes a sensor disposed on the second conveyance passage so as to read an image on a printed matter and acquires quality information of a printed matter based on output of the sensor; and
a processor that compares the quality information acquired from the first quality information acquisitor and the second quality information acquisitor with a predetermined quality standard, thereby determining whether a printed matter conveyed to the deliverer is a printed matter of a first quality satisfying the quality standard or a printed matter of a second quality not satisfying the quality standard,
wherein while executing a print job that designates a delivery destination of a printed matte of the first quality to the first delivery tray, and prints multiple sets in which each set includes multiple sheets subjected to image formation in order of pages based on multiple page image data, in a case of having determined that a printed matter being conveyed is a printed matter of the second quality, the processor controls such that printed matters of one set consecutive from the printed matter of the second quality are delivered to the second delivery tray, and thereafter, a printed matter of the first quality is delivered to the first delivery tray.

16. A non-transitory computer-readable storage medium storing a control program for an image forming system equipped with a deliverer that includes a first delivery tray and a second delivery tray and delivers a printed matter with an image formed on the sheet in an image former, and a quality information acquisitor that includes a sensor disposed on a conveyance passage and acquires quality information of a printed matter based on output of the sensor, the control program making the image forming system execute the steps of:
- starting execution of a print job that designates a delivery destination of a printed matte of the first quality to the first delivery tray, and prints multiple sets in which each set includes multiple sheets subjected to image formation in order of pages based on multiple page image data;
- acquiring quality information of a printed matter being conveyed from the quality information acquisitor;
- determining by comparing the quality information with a predetermined quality standard whether a printed matter conveyed to the deliverer is a printed matter of a first quality satisfying the quality standard or a printed matter of a second quality not satisfying the quality standard, delivering, in a case of having determined that a printed matter being conveyed is a printed matter of the second quality, printed matters of one set consecutive from the printed matter of the second quality to the second delivery tray; and
- delivering, after the delivering to the second delivery tray, a printed matter of the first quality to the first delivery tray.

\* \* \* \* \*